United States Patent
Nerieri et al.

(10) Patent No.: US 8,407,306 B1
(45) Date of Patent: Mar. 26, 2013

(54) SYSTEMS AND METHODS FOR MANAGING MESSAGE DELIVERY BASED ON MESSAGE PRIORITY

(71) Applicant: Google Inc., Mountain View, CA (US)

(72) Inventors: Francesco Nerieri, Santa Cruz, CA (US); Fred Quintana, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/644,828

(22) Filed: Oct. 4, 2012

Related U.S. Application Data

(60) Provisional application No. 61/664,023, filed on Jun. 25, 2012.

(51) Int. Cl.
*G06F 15/16* (2006.01)
*G06F 12/00* (2006.01)

(52) U.S. Cl. ............................. 709/206; 709/207

(58) Field of Classification Search .......... 709/206–207, 709/203, 225–229, 250
See application file for complete search history.

(56) References Cited

U.S. PATENT DOCUMENTS

| | | | | |
|---|---|---|---|---|
| 7,953,451 | B2 * | 5/2011 | Smith et al. | 455/566 |
| 2006/0242257 | A1 * | 10/2006 | Kuribayashi | 709/214 |
| 2009/0103433 | A1 * | 4/2009 | Katis et al. | 370/230 |
| 2009/0106617 | A1 * | 4/2009 | Katis et al. | 714/748 |
| 2012/0110173 | A1 * | 5/2012 | Luna et al. | 709/224 |
| 2012/0222036 | A1 * | 8/2012 | Yoshimura | 718/103 |

\* cited by examiner

*Primary Examiner* — Zarni Maung
(74) *Attorney, Agent, or Firm* — Troutman Sanders LLP; James E. Schutz; Mark L. Jones

(57) ABSTRACT

The disclosed technology covers messaging systems and methods. An example messaging system may include a messaging server, a plurality of predetermined conditions, and a communication interface. The messaging server may receive one or more messages directed to a first computing device, and may assign a priority level to each of the messages. The plurality of predetermined conditions may determine when to transmit the one or more messages to the first computing device, and a first predetermined condition may be deemed met when at least one message directed toward the first computing device is assigned high priority. The communication interface may transmit the one or more messages to the first computing device if at least one of the predetermined conditions is met. The messaging server may repeatedly evaluate the predetermined conditions and may hold the one or more messages until at least one of the predetermined conditions is met.

18 Claims, 3 Drawing Sheets

SYSTEMS AND METHODS FOR MANAGING MESSAGE DELIVERY BASED ON MESSAGE PRIORITY

CROSS-REFERENCE TO RELATED APPLICATIONS

The application claims priority and the benefit under 35 U.S.C. §119(e) of U.S. Provisional Patent Application No. 61/664,023, filed 25 Jun. 2012, which is incorporated herein by reference in its entirety as if fully set forth below.

TECHNICAL FIELD

Various aspects of the disclosed technology relate to push notifications and, more particularly, to managing push message delivery based on device activity.

BACKGROUND

Push notification services are in widespread use for sending messages to various computing devices, including mobile devices. For example, a push notification may be sent from an email server to a user's mobile device to notify the user of receipt of a new email message. Push services can reduce the required work of a mobile device by relieving the mobile device of the need to continuously check for new email or other new messages from remote servers.

A downside of push messaging is that a mobile device must be awake, i.e., powered up, in order to receive new messages. By delivering messages unprompted, a messaging server may repeatedly wake up a device, thus draining its battery power.

BRIEF SUMMARY

Various implementations of the disclosed technology manage message delivery to computing devices to find a balance between preserving battery power and delivering messages as quickly as possible.

An example messaging system according to the disclosed technology may comprise a messaging server, a storage medium comprising a plurality of predetermined conditions, and a communication interface. The messaging server may be configured to receive a plurality of messages, to identify one or more of messages as being directed to a first computing device, and to assign a priority level to each of the one or more messages. The plurality of predetermined conditions may determine when to transmit the one or more messages to the first computing device. A first predetermined condition may be deemed met when at least one message at the messaging server is directed toward the first computing device and is assigned high priority. The communication interface may be configured to transmit the one or more messages to the first computing device if at least one of the predetermined conditions is met. The messaging server may repeatedly evaluate the predetermined conditions and may hold the one or more messages until at least one of the predetermined conditions is met.

Another implementation of the disclosed technology is a computer program product embodied in a non-transitory computer-readable medium, the computer program product comprising an algorithm adapted to effectuate a method. The method may include receiving, at a messaging server in communication with a plurality of computing devices, a plurality of messages directed toward a mobile device. A priority level may be assigned to each of the plurality of messages. The plurality of messages may be transmitted to the mobile device if at least one of the plurality of messages is assigned a high priority, or if at least one other predetermined condition is met. Otherwise, the plurality of messages may be held at the messaging server until a new message is received that is directed toward the mobile device and assigned high priority, or until at least one other predetermined condition is met.

Another implementation of the disclosed technology is a computer-implemented method. The method may include receiving at a messaging server a plurality of messages directed toward a plurality of computing devices, the plurality of messages including one or more messages for transmission to a first computing device. Each of the one or more messages may be classified as either high priority or low priority. Delivery of the one or more messages may be postponed until at least one of a set of predetermined conditions is met. The predetermined conditions may include a first predetermined condition that at least one received message is classified as high priority. With a computer processor, it may be detected that at least one of the predetermined conditions is met. The one or more messages may be transmitted to the first computing device in response to the detection that at least one of the predetermined conditions is met.

These and other objects, features, and advantages of the messaging systems and methods will become more apparent upon reading the following specification in conjunction with the accompanying drawing figures.

DETAILED DESCRIPTION

Figure 1:
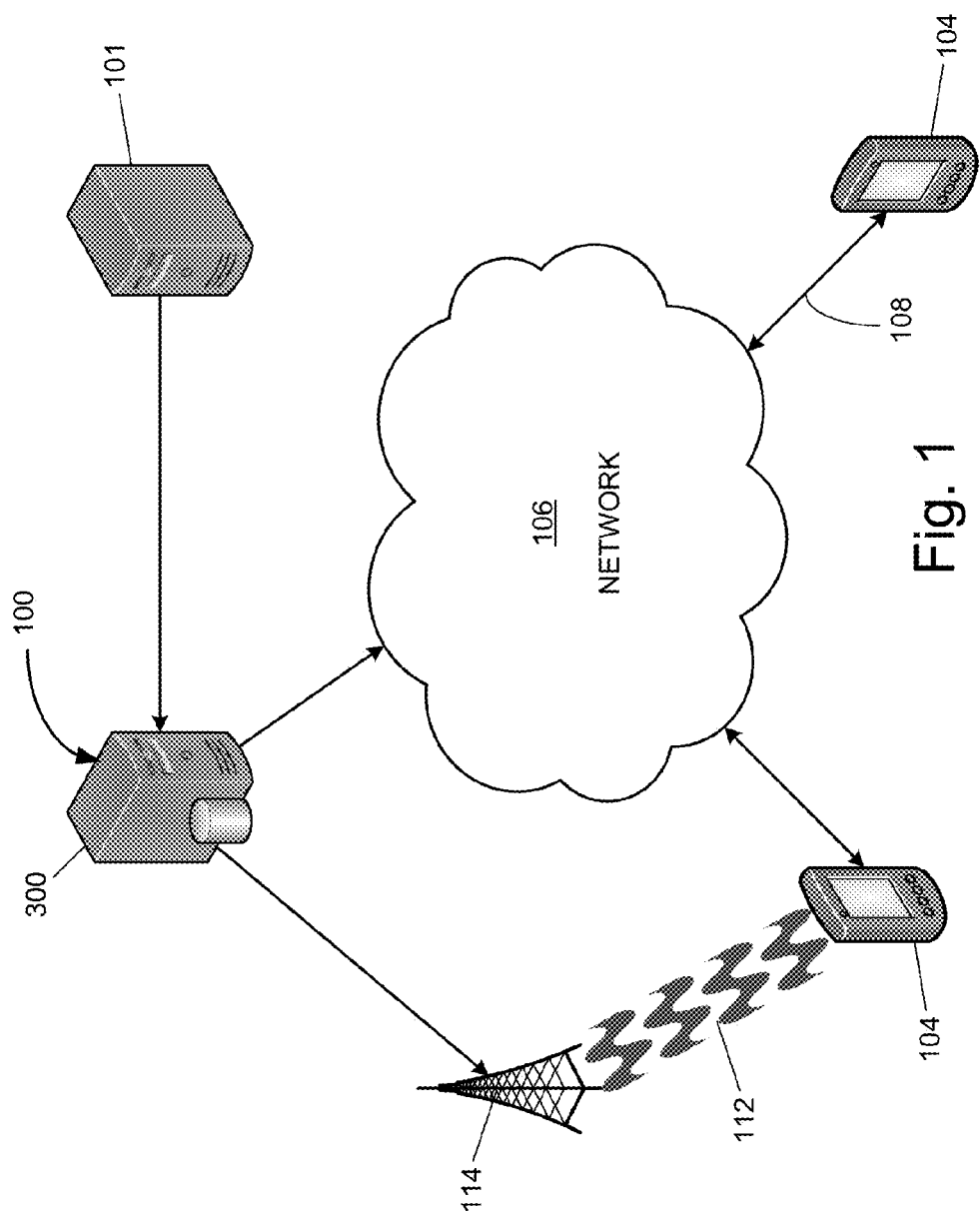
FIG. 1 is a block diagram of an illustrative messaging system, according to an implementation of the disclosed technology.

To facilitate an understanding of the principles and features of the disclosed technology, illustrative implementations are explained below. Various implementations of the disclosed technology are messaging systems and methods for batching data to be delivered to mobile devices, so as to balance battery life of the mobile devices with fast message delivery. In particular, implementations of the messaging system are described in the context of being used for messaging on mobile devices, such as a smartphone or tablet. Implementations of the disclosed technology, however, are not limited to this context. Rather, implementations may manage message delivery for various types of computing devices, as opposed to just traditional "mobile" devices, that may benefit from improved power management.

The components described hereinafter as making up various elements of the disclosed technology are intended to be illustrative and not restrictive. Many suitable components that would perform the same or similar functions as components described herein are intended to be embraced within the scope of the messaging systems and methods. Such other components not described herein may include, but are not limited to, for example, components developed after development of the disclosed technology.

Many mobile devices currently use push messaging to receive data. A push message is data transmitted to the mobile device without prompting, or without the mobile device first having to check for messages. A message may be directed to a mobile device from, for example, an application server remote from the mobile device. In some instances, the message may be transmitted from the application server to a messaging server, which may manage message delivery for a plurality of mobile devices receiving push messages from a plurality of sources.

In conventional messaging systems, push messages are transmitted from the messaging server to the recipient mobile devices upon receipt of the messages at the messaging server. This generally occurs without purposeful delay. As a result, mobile devices receive their messages efficiently, without having to prompt the messaging server to determine whether messages are waiting. A drawback of conventional messaging systems is that transmitting messages requires turning on a radio of the mobile device, which may drain the battery.

The disclosed technology recognizes that messages need not always be delivered immediately. A messaging system of the disclosed technology may hold received messages at the messaging server until one or more predetermined conditions are met. The predetermined conditions may be based on various factors relating to the state, or status, of the computing device and the prioritization of the messages received.

Referring now to the figures, in which like reference numerals represent like parts throughout the views, various implementations of the messaging systems and methods will be described in detail.

FIG. 1 is a block diagram of an illustrative messaging system 100 according to the disclosed technology. The messaging system 100 may be embodied, in whole or in part, in a messaging server 300 in communication with one or more application servers 101. The messaging server 300 may be or include a computer system, such as that illustrated in FIG. 3.

The messaging server 300 may receive messages from the application server 101, and may communicate the received messages to various computing devices 104, such as a mobile device or desktop or laptop computer, by push messages. It will be understood that there are numerous categories of mobile devices 104 that can run on batteries and may therefore benefit from the disclosed technology. For example, mobile devices 104 can include, but are not limited to, portable computers, tablets, Internet tablets, personal data assistants, ultra mobile personal computers, and smartphones.

The application servers 101 may be servers supporting applications installed on, or running on, the computing devices 104. Occasionally, an application server 101 may transmit a data message for use in its corresponding application on a computing device 104. It will be understood that a message need not be an email or a text message, but may alternatively be various types of data delivered to the mobile device as a transmission from a remote device. For example, and not limitation, the application server 101 may be associated with a weather application, and may transmit weather updates to the computing device 104. For another example, the application server may be associated with an electronic mail application, and may transmit email messages to the computing device 104. Messages from the application server 101 may be delivered by way of the messaging server 300, which may manage delivery according to the disclosed technology, as will be described further below.

The messaging server 300 may communicate with the computing device 104 in various ways. For example, the messaging server 300 may communicate with the computing device 110 through a Wi-Fi channel or another Internet connection 108, and may utilize a network 106 for communication with the computing device 104. For another example, the messaging server 300 may communicate to the computing device 104 through a service provider 114, such as a cellular service provider or other network provider supporting mobile devices. The service provider 114 may provide cellular service through cellular radio channels 112 for communicating with the mobile device 104. In that case, the messaging server 300 may communicate or send messages to the mobile device 104 through the service provider 114.

The messaging server 300 may be in communication with a plurality of computing devices 104 belonging to a plurality of users. Further, the messaging server 300 may receive a plurality of messages for the various computing devices 104. The messaging server 300 may sort the received messages and associate each message with its intended recipient computing device 104. Instead of delivering all messages to the recipient computing devices 104 immediately upon receipt, the messaging server 300 may batch the messages for each computing device 104. In the case of priority messages, however, the messaging server 300 may make an exception and deliver these messages to the recipient computing devices 104 immediately, or without purposeful delay.

The messaging server 104 may assign a priority to each message received for a computing device 104. The rules for prioritization may be based on various factors and may be fixed across all computing devices 104 or, alternatively, customized for each individual or group of computing devices 104. For example, and not limitation, email and Voice Over IP (VoIP) messages may be categorized as high priority, while weather alerts and application updates may be categorized as low priority.

In some implementations, past or current usage patterns of a computing device 104 may determine, at least in part, how messages are categorized. For example, if a particular application is frequently or recently used on a computing device 104, then the messaging server 300 may deem that application to be a preferred application for the computing device 104, and may automatically and dynamically determine that messages related to that particular application are given high priority. Analogously, messages for applications that are rarely used or have not been used within a predetermined time period may be assigned low priority, even if they previously had high priority status. In some example implementations, one or more particular applications may be deemed preferred by default, and messages associated with those applications may be given high priority by default. Messages of other applications may be given low priority by default.

The messaging server 300 may hold messages, i.e., not transmit them to their intended recipient computing device 104, until one or more predetermined conditions are met for the recipient computing device 104. In an example implementation, the messaging server 300 may have access to state, or status, information related to the computing device 104. The computing device 104 may send information about its current state to the messaging server 300. The information may be sent either at the prompting of the messaging server 300 or, alternatively, autonomously by the computing device 104. For example, and not limitation, the computing device 104 may send to the messaging service 300 information about its current battery level, whether the computing device 104 is fully charged or is plugged into an external power source, whether the radio is currently active, current location, the type of network on which the computing device 104 is being used (e.g., Wi-Fi, 3G, 4G), whether it is unlocked or currently in use, or whether it just became in use.

Some information about the computing device's state may not be unique to a particular computing device 104, and the messaging server 300 may have access to that type of information from other sources or by retaining past data about the computing device 104. For example, and not limitation, the messaging server 300 may also have information about the current date, time of day, and past usage patterns of the computing device 104 in question as well as other computing devices 104 in the local area of the computing device 104.

The predetermined conditions for a computing device 104 may be based, at least in part, on aspects of the above information, or other information, about the computing device 104 or on the prioritization of messages received for delivery to the computing device 104. For example, and not limitation, a predetermined condition may be deemed to be met if at least one of the following is true: the radio state of the computing device is active; a predetermined number of messages have been received and are being held for the computing device 104; a predetermined time period, based on the network type to which the computing device 104 is connected, has not yet lapsed since the last batch of messages was transmitted to the computing device 104; at least one high priority message has just been received; or some other predetermined number of high priority messages has been received and are being held for the computing device 104.

When a predetermined condition is met for a computing device 104, the server may flush the collected messages for that computing device 104 and transmit them all to the computing device 104. As a result, messages may be held to preserve battery life of the computing device 104, but not at the expense of failing to promptly delivery an important message that has been deemed a high priority. Additionally, because little additional battery power is consumed by a computing device 104 when receiving a batch of messages, as opposed to only a single high priority message, the messaging server 300 may flush all collected messages along with a high priority message that prompts the transmission.

In some computing devices 104, the radio stays up for a predetermined time period that is based on the type of network to which the computing device 104 is operating. For example, this time period may be different when a computing device 104 is connected to cellular network, as compared to Wi-Fi. Thus, the battery power is only minimally impacted by continuing to transmit messages for a time period that is based on the radio-up time associated with the network type, as the radio will remain up regardless of whether messages are being sent. As a result, having a predetermined condition related to network type may encourage fast message delivery at a time when battery power would not be significantly impacted.

Figure 2:
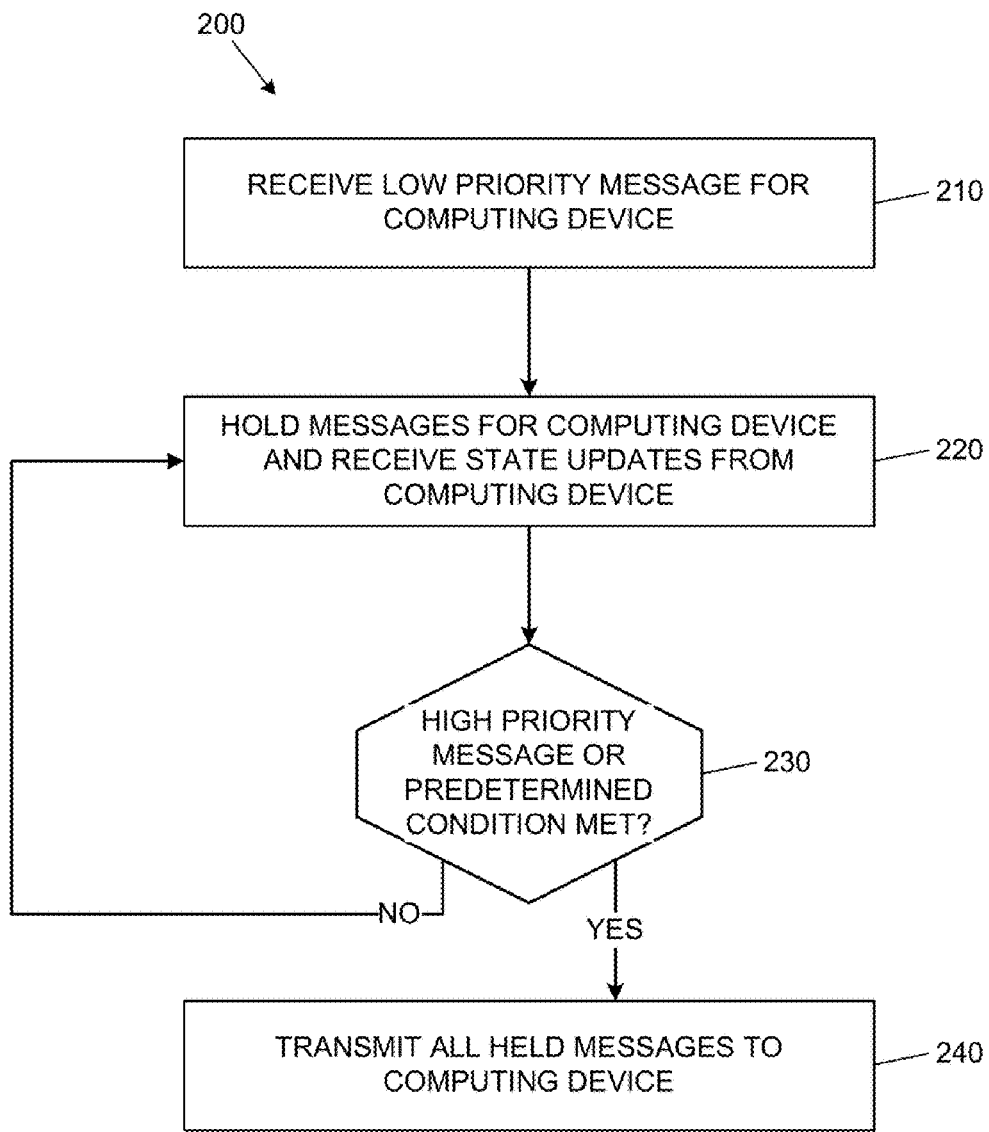
FIG. 2 is a flow diagram of a method for managing message delivery, according to an implementation of the disclosed technology.

FIG. 2 illustrates a flow diagram of a method 200 according to the disclosed technology. As shown, at 210, one or more messages are received by the messaging server 300 for a computing device 104, and the messaging server determines that the messages are low priority. At 220, these low priority messages may be held, i.e., not yet transmitted to the computing device 104, and the messaging server 300 may receive one or more state updates from the computing device 104. If no high priority messages for the computing device 104 are yet received, and if no other predetermined condition for the computing device is met, at 230, then the messaging server 300 may continue its holding pattern, at 220. If at 230, it is determined that a new high priority message has been received, or that some other predetermined condition is now met (e.g., the computing device's radio is now active), then the messaging server 300 may transmit all held messages for the computing device 104 to the computing device 104, at 240.

It will be understood that the various steps shown in FIG. 2 are illustrative only, and that steps may be removed, other steps may be used, or the order of steps may be modified. It will also be understood that state updates from the computing device 104 may be received at various points throughout the method 200, especially if provided autonomously by the computing device 104.

Figure 3:
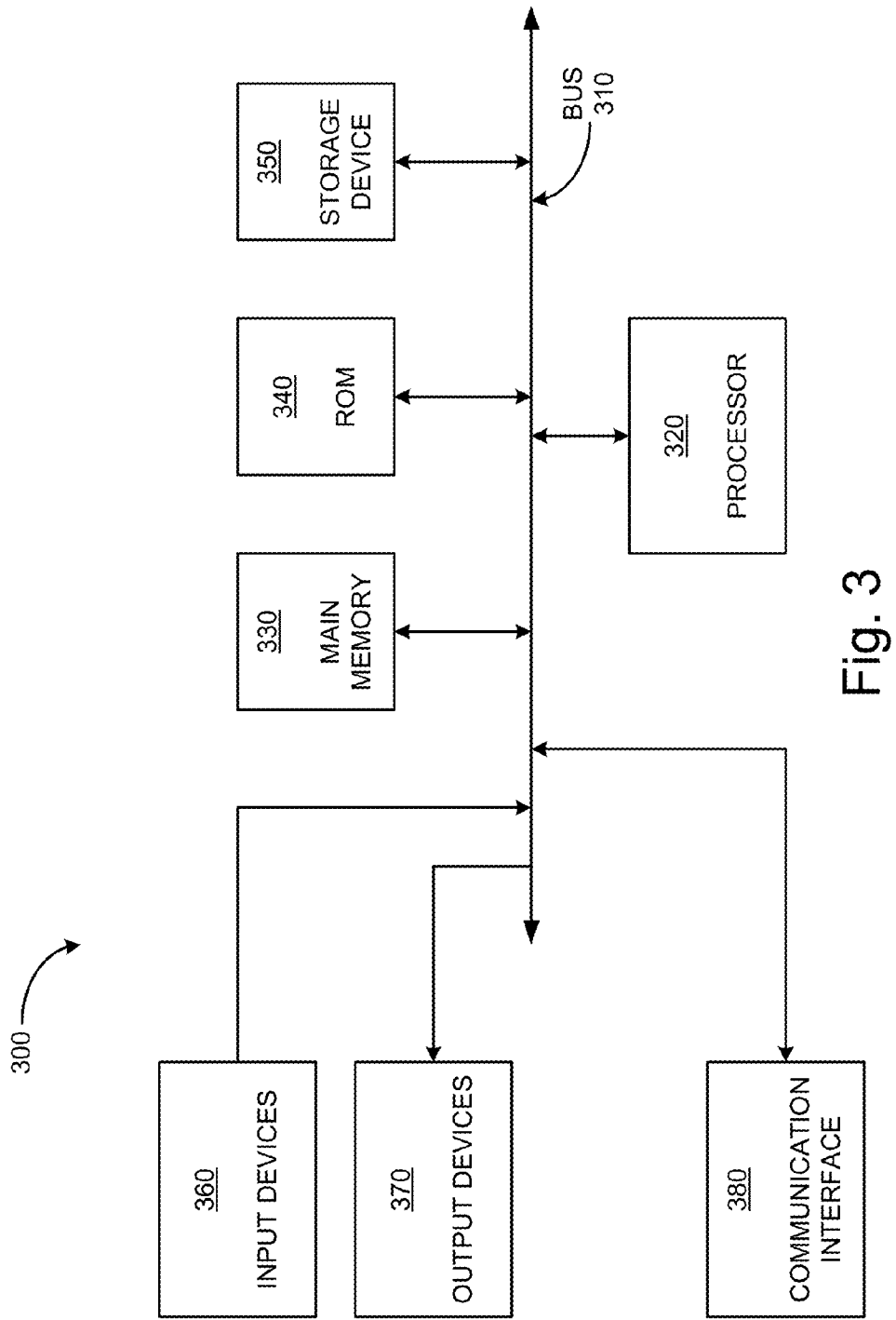
FIG. 3 is a diagram of an architecture of a messaging server, according to an implementation of the disclosed technology.

Various implementations of the messaging systems 100 and methods may be embodied in non-transitory computer readable media for execution by a computer processor. FIG. 3 is a diagram of an example architecture of a messaging server 300, in an implementation consistent with the disclosed technology. As shown, the messaging server 300 may include a bus 310, a processor 320, a main memory 330, a read only memory (ROM) 340, a storage device 350, one or more input devices 360, one or more output devices 370, and a communication interface 380. The bus 310 may include one or more conductors that permit communication among the components of the messaging server 300.

The processor 320 may be one or more conventional processors or microprocessors that interpret and execute instructions, such as instructions for providing aspects of the disclosed technology. The main memory 330 may include a random access memory (RAM) or another dynamic storage device that stores information and instructions for execution by the processor 320. The ROM 340 may include a conventional ROM device or another type of static storage device that stores static information or instructions for use by the processor 320. The storage device 350 may include a magnetic or optical recording medium and its corresponding drive.

The input devices 360 may include one or more mechanisms that permit an operator to input information to the messaging server 300, such as a keyboard, a mouse, a pen, voice recognition, or biometric mechanisms. The output devices 370 may include one or more mechanisms that output information to an operator, including a display, a printer, or a speaker. The communication interface 380 may include any transceiver-like mechanism that enables the messaging server 300 to communicate with remote devices or systems, such as a mobile device or other computing device 104 to which messages are delivered. For example, the communication interface 380 may include mechanisms for communicating over a network.

As discussed above, the messaging server 300 may manage message delivery to a plurality of computing devices 104. The messaging server 300 may perform tasks to that end in response to the processor 320 executing software instructions contained in a computer-readable medium, such as memory 330. The software instructions may be read into memory 330 from another computer-readable medium, such as the data storage device 350, or from another device via the communication interface 380. Alternatively, or additionally, hard-wired circuitry may be used in place of or in combination with software instructions to implement processes consistent with the disclosed technology. Thus, the disclosed technology is not limited to any specific combination of hardware circuitry and software.

While the messaging systems 100 and methods have been disclosed in illustrative examples, it will be apparent to those skilled in the art that many modifications, additions, and deletions may be made without departing from the spirit and scope of the systems, methods, and their equivalents, as set forth in the following claims.

What is claimed is:

1. A messaging system comprising:
 a messaging server configured to receive a plurality of messages, to identify one or more of messages as being directed to a first computing device, and to assign a priority level to each of the one or more messages;

a storage medium comprising a plurality of predetermined conditions for determining when to transmit the one or more messages to the first computing device, wherein a first predetermined condition is met when at least one message at the messaging server is directed toward the first computing device and is assigned high priority, and wherein one or more rules for assigning a priority level to the one or more messages are based on past usage of the first computing device; and a communication interface configured to transmit the one or more messages to the first computing device if at least one of the predetermined conditions is met;

wherein the messaging server repeatedly evaluates the predetermined conditions and holds the one or more messages until at least one of the predetermined conditions is met.

2. The messaging system of claim 1, wherein one or more rules for assigning the priority level are different for messages directed to the first computing device than for messages directed to a second computing device.

3. The messaging system of claim 1, wherein the messaging server assigns a first message high priority based on its association with an application that is frequently or recently used at the first computing device.

4. The messaging system of claim 3, wherein the messaging server assigns a second message low priority based on its association with an application that is infrequently and not recently used at the first computing device.

5. The messaging system of claim 1, wherein a second predetermined condition is met when at least a predetermined number of messages directed to the first computing device are being held at the messaging server.

6. The messaging system of claim 1, wherein a second predetermined condition is met when the radio state of the first computing device is active.

7. The messaging system of claim 1, the messaging server being further configured to receive a current status of the first computing device from the first computing device, and wherein a second predetermined condition is based on the current status of the first computing device.

8. The messaging system of claim 1, the messaging server being further configured to transmit to the first computing device all held messages that are directed to the first computing device, in response to assigning high priority to at least one message directed to the first computing device and currently held at the messaging server.

9. A computer program product embodied in a non-transitory computer-readable storage medium that stores instructions executable by one or more processors to perform a method, the method comprising:
    receiving, at a messaging server in communication with a plurality of computing devices, a plurality of messages directed toward a mobile device;
    assigning a priority level to each of the plurality of messages, wherein one or more rules for assigning a priority level to each of the plurality of messages are based on past usage of the mobile device;
    transmitting the plurality of messages to the mobile device if at least one of the plurality of messages is assigned a high priority, or if at least one other predetermined condition is met; and
    holding the plurality of messages at the messaging server until a new message is received at the messaging server that is directed toward the mobile device and assigned high priority, or until at least one other predetermined condition is met.

10. The computer program product of claim 9, the method further comprising transmitting the new message and the plurality of messages to the mobile device in response to assigning high priority to the new message.

11. The computer program product of claim 9, the method further comprising:
    detecting a radio state of the mobile device; and
    determining that at least one other predetermined condition is met as a result of the first computing device having an active radio state.

12. The computer program product of claim 9, the method further comprising continuing to transmit incoming messages to the mobile device for a predetermined period, after transmitting the plurality of messages and the new message to the mobile device.

13. The computer program product of claim 12, wherein the predetermined period is determined by a current network type associated with the mobile device.

14. A computer-implemented method comprising:
    receiving at a messaging server a plurality of messages directed toward a plurality of computing devices, the plurality of messages including one or more messages for transmission to a first computing device;
    classifying each of the one or more messages as either high priority or low priority, wherein a rule for classifying the one or more messages as high priority or low priority varies based on a usage history of the first computing device;
    postponing delivery of the one or more messages until at least one of a set of predetermined conditions is met, wherein the predetermined conditions include a first predetermined condition that at least one received message is classified as high priority;
    detecting, with a computer processor, that at least one of the predetermined conditions is met; and
    transmitting the one or more messages to the first computing device in response to the detection that at least one of the predetermined conditions is met.

15. The computer-implemented method of claim 14, further comprising detecting a radio state of the first computing device, wherein at least one of the predetermined conditions is met when the first computing device is in an active radio state.

16. The computer-implemented method of claim 14, further comprising:
    detecting a network type of the first computing device; and
    continuing to transmit incoming messages to the first computing device for a predetermined time period, after transmitting the one or more messages to the first computing device, wherein the predetermined time period is based on the network type.

17. The computer-implemented method of claim 14, wherein a first message associated with a preferred application on the first computing device is automatically assigned high priority.

18. The computer-implemented method of claim 17, wherein preferred application status is dependent on the usage history of the computing device.

* * * * *